May 9, 1939.　　　　G. SCHMIDT　　　　2,157,575

FIRE CONTROL FOR MACHINE GUNS

Original Filed May 15, 1936　　　4 Sheets-Sheet 1

INVENTOR
G. Schmidt
BY
Morgan Finnegan & Durham
ATTORNEYS

May 9, 1939.   G. SCHMIDT   2,157,575
FIRE CONTROL FOR MACHINE GUNS
Original Filed May 15, 1936   4 Sheets-Sheet 3

INVENTOR
G. Schmidt
BY
Morgan Finnegan Durham
ATTORNEYS

May 9, 1939.   G. SCHMIDT   2,157,575
FIRE CONTROL FOR MACHINE GUNS
Original Filed May 15, 1936   4 Sheets-Sheet 4

INVENTOR
G. Schmidt
BY
Morgan Finnegan & Durham
ATTORNEYS

Patented May 9, 1939

2,157,575

UNITED STATES PATENT OFFICE 2,157,575

FIRE CONTROL FOR MACHINE GUNS

Grayson Schmidt, Fort Kamehameha, Territory of Hawaii, assignor to George B. Finnegan, Jr., Cove Place, Mountain Lakes, N. J.

Application May 15, 1936, Serial No. 79,822
Renewed October 5, 1938

9 Claims. (Cl. 33—66)

The invention relates to fire control for guns and more especially to novel methods and means for controlling and correcting the fire of machine guns against moving targets.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

The object of the invention is to improve the accuracy in control and correction of gun fire on moving targets such as airplanes, tanks, ships at sea, and the like. The invention is especially directed to improvements in the fire control of guns firing a rapid succession of projectiles at such targets, and employing means for rendering some or all of the projectiles visible throughout the whole or a part of their path. An example of the artillery problem to which the invention is peculiarly adapted is the firing of anti-aircraft machine guns at fast moving aerial targets when tracer ammunition is employed and the target is within the visible or burning range of the tracers.

According to the present military practice, adjustment of fire of anti-aircraft machine guns using tracer ammunition is accomplished by so pointing the gun as to make the stream of projectiles pass through the target as evidenced by the visible course of the tracers. Actually, however, this method is very inaccurate and misleading because of a visual illusion as to the relation between the path of the tracer and the position of the rapidly moving aerial target. That is, when a gunner fires a tracer bullet at a moving airplane, although the path of the tracer may appear to pass through the target, the projectile at the range of the target may actually be passing wide of the target. This illusion is caused by lack of depth perception in the human eye beyond relatively short ranges and by other factors hereinafter explained in greater detail.

The invention provides a novel and useful method and means for rendering apparent to the gunner the true positional relation between the target and the projectile when the projectile is at the range of the target. The invention may be practiced with very simple and inexpensive equipment which may be readily applied to anti-aircraft machine guns without modification of their standard sighting and firing mechanisms. Furthermore the use of the invention does not interfere with nor hamper the normal and rapid operation of the machine gun, but may be applied to and employed at any time during the normal firing of the gun without hampering or modifying the normal practice of the gunner in any way. The invention permits continuous application of corrections to the gun pointing during fire, but requires no preliminary or concurrent calculations, data computing or the like. The gun may go into action regardless of whether or not the mechanism of the invention is ready to function and the invention may commence functioning at any time during the operation of the gun, thereby to permit improvement of the fire already being conducted.

The invention enables the gunner to visualize the actual deviation of the projectile at the instant it is at the range of the target and thereby to apply the necessary angular corrections in the pointing of the gun for future shots. Broadly stated, by the invention the gunner is given a signal at the instant the tracer bullet is at the same range from the gun as the target, so that he can actually see the true lateral and vertical deviations between target and bullet at that instant. This information or signal is given to the gunner by an observer situated on the flank and in position to make observation on a line intersecting the target and the tracer path. By suitable means hereinafter described the intersecting observations or lines of sight of the gunner and of the flank observer are synchronized so that they will both view the tracer at the same instant, that instant being the one when the flank observer sees the tracer bullet cross the line between himself and the target. The synchronization of the intersecting observations on the tracer bullet is effected by suitable signal or other intelligence transmitted from the flank observer to the gunner. Thus the gunner will know that the relative positions of tracer and target which he sees at that instant are their true positions at the range of the target. With this knowledge the gunner can correct his fire accordingly for future shots.

The synchronizing signal between the flank observer and the gunner can be transmitted in various ways, the primary requirement being that some sensory impression be given to the gunner at the instant desired. This impression may be aural or by touch, or otherwise, but preferably the signal is a visual one which does not interfere with the normal observation of the tracers and target continuously being made by the gunner.

Before describing in greater detail the operations and mechanisms embodying the invention, it appears desirable to explain more fully the factors involved in the problem of fire control and fire correction of anti-aircraft machine guns using tracer ammunition. In present practice the tactical employment of anti-aircraft machine guns is on fast flying aerial targets at ranges less than 2000 yards. At such ranges the rate of angular travel of a gun sighted on the target is relatively high. The targets appear suddenly and pass rapidly across the field of vision within range of the machine gun. Consequently the opportunity for using accurate mechanical data computers for calculating the aiming deflections and applying them to the guns is frequently so slight that such mechanisms are of limited practical use in the field.

Thus for the most part, the only means now available for fire correction under field conditions is tracer ammunition. A machine gun which fires approximately 500 rounds per minute is loaded with tracer bullets at intervals of one to five non-tracer, or greater, so that tracers are fired at intervals of substantially one per second or oftener. The gunner is taught to use the stream of projectiles, visibly indicated by the recurrent tracers, as he would in pointing a stream of water from a hose at a moving target. Sufficient angular lead, both vertically and horizontally, is given to the gun while following the target with the eye to compensate for the angular travel of the target during the flight of the projectile, plus the usual ballistic corrections for super-elevation, wind, drift, jump, air density, etc. Thus with a target travelling from right to left the gunner will keep his eye constantly sighted on the target by swinging the gun at the same angular speed and with the lead estimated to be necessary. By so pointing the gun that the successive tracers seem to disappear into the target, the stream of bullets will (in theory) be hitting the target.

The above-described method of correcting fire by tracer observation produces serious errors in pointing. Such errors are chiefly caused by the illusion that the tracers are passing through the target when actually they may be wide of it. This illusion is largely the result of the failure of depth perception of the human eye at distances of approximately beyond 500 yards and is due to the apparent curvature in the tracer trajectory or path as it travels from the gun to the path of the moving target.

Figure 1:
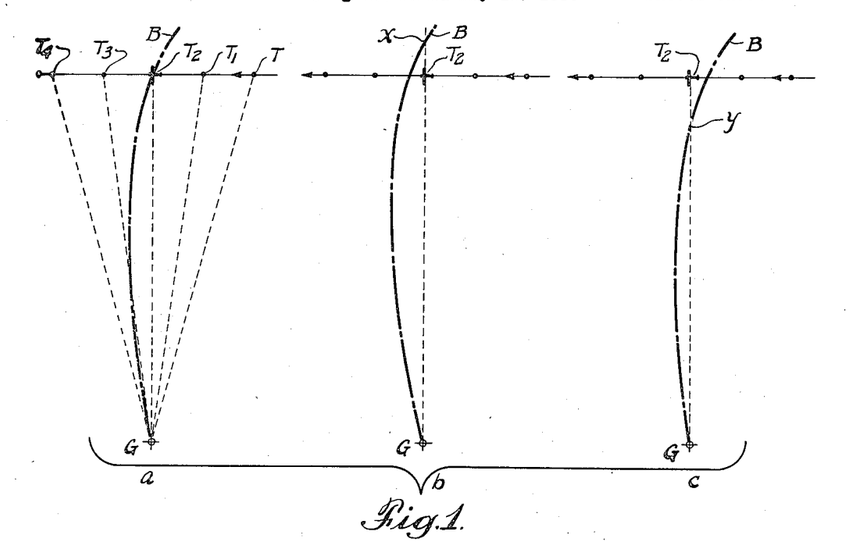
Fig. 1 is a diagrammatic plan view illustrating three situations in the problem of machine-gun fire at a moving target.

To understand the cause of said apparent curvature of the tracer trajectory, consider the factors illustrated diagrammatically in Figures 1a, 1b and 1c. These figures illustrate in plan the visual effect produced on the gunner as he fires a tracer bullet at an airplane target travelling from right to left across his front at a range of say 1000 yards—i. e., a distance within the burn-out range of the tracer and beyond the limit of depth perception. The position of the gunner is indicated by G; the path of the target by the horizontal line, with successive positions of the target therein being marked T, T1, etc. The airplane, or moving target is diagrammatically shown at T2, in the position of intended impact by the particular tracer bullet under consideration. The apparent path of the tracer (disregarding curvature in the vertical plane) is indicated by the curved line GB, while the lines of sight of the gunner to the target in its successive positions are indicated by the dotted radial lines GT, GT1, etc.

The tracer path or trajectory GB appears to the gunner as a curved line because of the successive relative positions between the tracer and the target on the successive lines of sight of the gunner. That is, the gunner constantly follows the target with his eyes, so that it becomes the fixed point in his field of view. The tracer, fired on a line in advance of the target at the position T seems thus to travel on a curve toward the right as the tracer and target approach each other. Due to retinal fatigue and other causes the tracer path seems to describe a fairly long path of fire in the air. Thus in Figure 1a, the tracer trajectory intersects the target at T2 on an apparent curve GB which seems to be to the left of the target at the shorter ranges and swings to the right after it has passed the target. The curvature appears to increase with the range due to the decreasing velocity of the projectile, lack of depth perception, etc.

In Figure 1b due to the excessive lateral lead the tracer trajectory actually passes to the left of or ahead of the target. However, because of the apparent curvature of the trajectory hereinbefore explained, the gunner looking along the line GT, will see the tracer apparently disappear into the target. Actually the tracer bullet is beyond the target at point X when it intersects the line GT2, but because of the failure in depth perception, the gunner has the illusion that the tracer actually passed through the target. In Figure 1c a similar illusion is illustrated in the case where the lateral lead of the gun is too small, so that the tracer actually crosses the path of the target to the right of or behind the target. In this case also the gunner, looking at the target on the line GT2 has the illusion that the tracer intersecting that line is passing through the target, whereas actually the tracer is short of the target at point Y.

As hereinbefore stated, the invention provides visual signalling means for synchronizing the simultaneous, intersecting tracer observations of the gunner and flank observations of the gunner and flank observer with the instant that the tracer bullet crosses the path of the target. This operation is preferably performed by means which rapidly and momentarily interrupts or otherwise impresses the vision of the gunner at the selected instant as he is following the tracer with his eye. Said means may conveniently comprise an aperture in the gunner's line of sight which can be very rapidly closed and opened at any desired instant so as to give a rapidly interrupted vision, similar to the flickering of a camera shutter. The effect of such shutter flickering is to cause the portion of the curved tracer trajectory then under observation to appear distinct or stationary. In another form of shutter, the effect is to cause the tracer to appear more distinct, or of a different color at the instant of observation. The shutter in the gunner's line of vision is controlled and operated by the flank observer so that the gunner's shutter will flicker at the instant the flank observer sees the tracer cross the line between the flank observer and the target.

Figure 2:
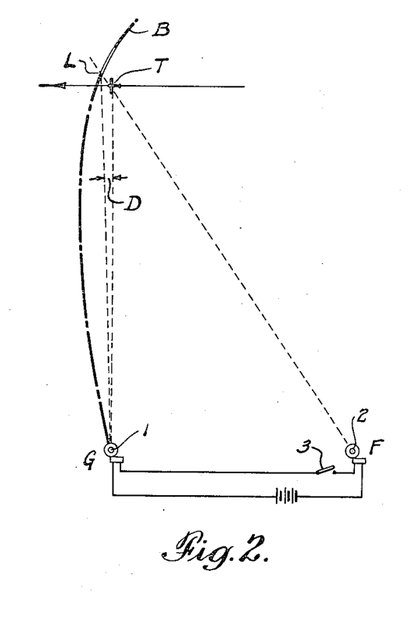
Fig. 2 is a diagrammatic plan view illustrating a simple embodiment of the invention and its operation.

The above described operation in so far as it applies to the path of a single tracer is exemplarily illustrated in Fig. 2. In this case the gunner at G has fired the tracer on an apparent curved path GB so that the bullet passed to the left or ahead of the target. The flank observer at F sees the tracer intersect the line FT as it passes at the approximate range of the target or the distance GT. By causing the gunner's shutter 1 to flicker at the instant the flank observer sees the tracer cross line FT, the gunner will see the tracer at the instant the tracer is at the point L on the line FT. That is, when the tracer is at point L, the gunner's shutter (diagrammatically shown at 1) will flicker and at that instant the trajectory will appear dotted or arrested and/or distinct in appearance from other points on the tracer trajectory. The gunner can thus visualize the true deviation, which is substantially the angle subtended by the line LT, that is, the angle D. Thus by reducing the lateral lead by the angle D, the next shot should be correctly placed.

Means for causing the gunner's shutter to flicker simultaneously with the flank observer's observation on the line FTL is diagrammatically illustrated in simple form in Fig. 2. As shown said mechanism comprises what are essentially two magnetically actuated camera shutters 1 and 2 at the gun and flank positions respectively. Said shutters are electrically connected in series so that they will operate together, under the control of the flank observer. A switch 3 under control of the flank observer F illustrates a simple means by which the flank observer can actuate the shutters at the desired times. Suitable control means for more automatically actuating and regulating the movements of the shutters will be hereinafter shown and described.

In applying the invention to the correction of successive tracer shots, as must be done in the field, means are provided for substantially automatically synchronizing the shutter signals with the firing of the successive tracers, so that the human lag or time delay which would occur in the operation of the simple switch illustrated in Fig. 2 will be practically eliminated. This feature of the invention is also directed to coordinating the gunner's observation through the shutter or signalling means with the trajectory of each successive tracer when it is near the range of the target, thereby preventing confusion which might result from failure to observe the proper tracer at the proper time.

Accordingly, mechanism is provided which will cause the shutters to flicker at a predetermined time after a tracer has left the muzzle of the gun and this operation will be repeated for each successive tracer. The predetermined time referred to will be the time of flight of the tracer to the range of the target; that is, the time required for the tracer to travel from the muzzle to the future position of the target. If the target were to fly at a constant range and that range or time of flight were known at the outset, the mechanism would consist simply of means for causing the shutters to flicker at regular intervals corresponding to the intervals between successive tracers as fired from the gun and each flicker would occur at a time within that interval which would represent the time of flight of a preceding tracer.

The mechanism for performing the foregoing functions will be later described in detail. The use of such mechanism and certain of its functions in a simplified problem are diagrammatically illustrated in Fig. 3. As shown, the circular line 10 represents the projection of the path of an airplane flying at a constant distance from the gunner G, such a path being shown to illustrate use of the invention in simplest form. Successive positions of the target T on said path 10 are indicated by the symbols T1, T2, and T3. The radial lines from G indicate the paths of successive tracer bullets fired from the gun and intended to strike the target at the future positions indicated by T1, T2 and T3 respectively. By the use of the mechanism as described above, the gunner's shutter or other signalling means is caused to operate automatically as each successive tracer bullet reaches the range of the target. That is, the gunner's shutter will function upon each successive tracer after that tracer has traveled from the gun for a time corresponding to the time of flight from gun to target. Thus in Fig. 3 the radial lines represent time of flight. By virtue of the shutter's operation, the gunner will receive a distinct visual impression as each successive tracer crosses the line 10, i. e., after it has traveled a distance corresponding to the predetermined time of flight. These successive impressions are indicated as S1, S2, S3, etc. The drawings indicate how the gunner is enabled to correct his fire by successive increases in lead to cause the intersection of the trajectory and the time of flight curve to meet the future position of the target. Thus in position S1 the tracer crossed the target path too late, indicating insufficient lead. The gunner thereupon increased his lead but signal S2 showed it to be still insufficient. At position T3 is shown a hit accomplished by a further increase in lead.

Figure 3:
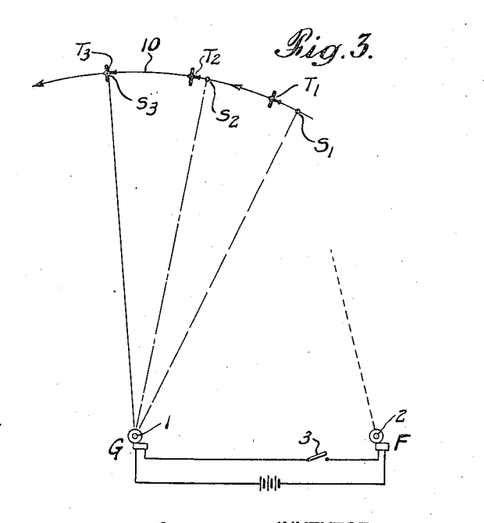
Fig. 3 is a similar view showing the operation of the invention on a target travelling at a constant range from the gun.
Figures 4, 5, 6, 7:
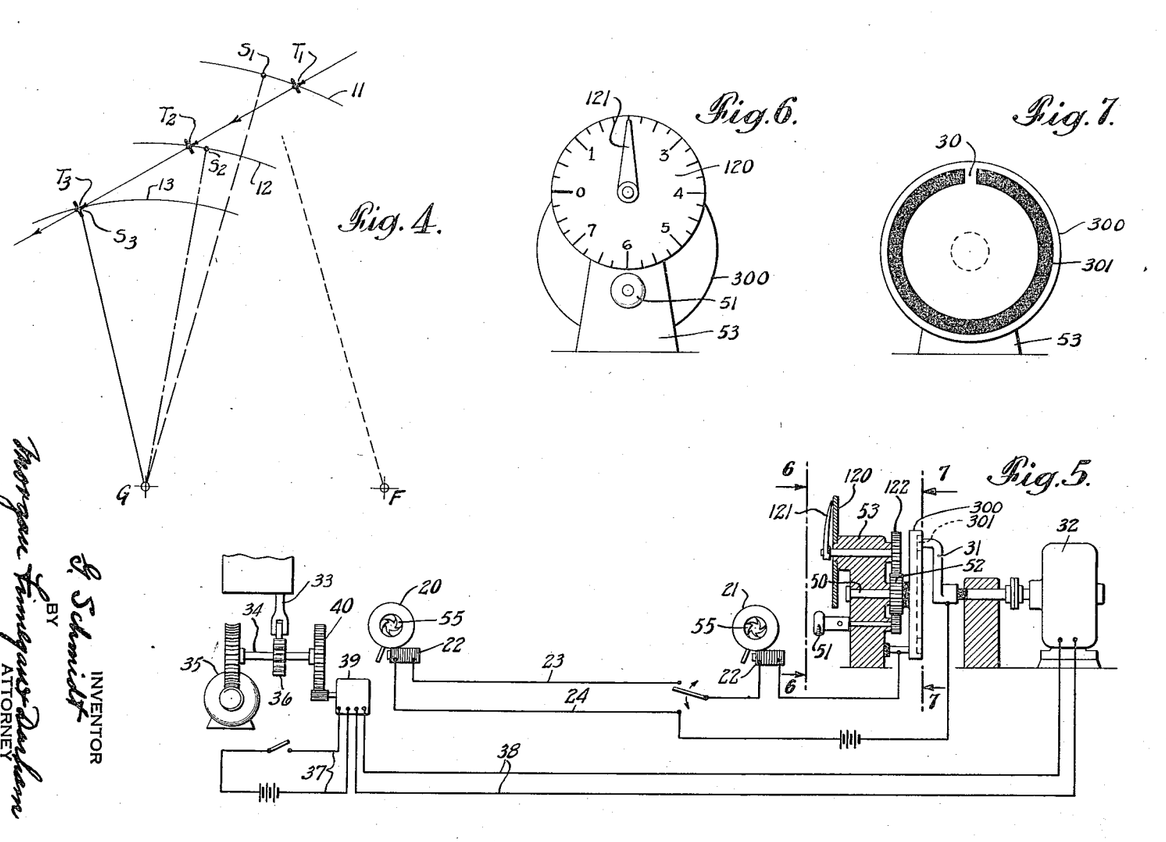
Fig. 4 is a similar view illustrating application of the invention to a target travelling on a course in which the range changes with respect to the gun.
Fig. 5 is a fragmentary elevation of the mechanical devices comprised in one embodiment of the invention, certain parts being shown in section.
Fig. 6 is an elevation view taken on the line 6—6 of Fig. 5.
Fig. 7 is a similar view on line 7—7 of Fig. 5.

The condition illustrated in Fig. 3 would probably never occur in practice. That is, the range or time of flight to the target normally changes continually as an airplane flies on any straight or usual course with respect to the gunner. Accordingly the invention provides means for controlling the operation of the shutters or other signals so that the signals will continue to occur at the range or time of flight distance in spite of changes in range. Referring to Fig. 4, there is illustrated a condition where the range is decreasing because the target is approaching the gun.

With the shutter signal set to occur on the circle 11 (which represents the time of flight from G to the target in the position T1), the gunner sees the tracer in the position S1, indicating too great a lead for that position. For the position T2 the signal is made to occur on a circle 12 which represents the time of flight to the target at that position. The signal indication S2 shows that the gunner had reduced his lead too much and that the second tracer passed behind the target. The signal for the third tracer is made to occur at a time of flight indicated by the circle 13 which corresponds to the range of the target in position T3. The signal S3 is shown as indicating a hit, the gunner having determined the proper deflections by means of the signals S1 and S2.

Referring now to Fig. 5 there is illustrated an embodiment of means for causing the shutter signals to occur successively at the same time intervals as the successive tracers are fired from the gun. These drawings also illustrate means for varying the occurrence of the signal within said interval so that the signal will occur at the predetermined instant corresponding to the range or time of flight of the future position of the target for a previously fired tracer. As shown, the mechanism comprises a magnetically operated camera shutter 20 mounted in the gunner's line of sight. Said shutter may be similar to a camera shutter of the iris type or may be of other forms, some of which are hereinafter described. A similar shutter 21 is positioned in the line of sight of the flank observer and the two shutters 20 and 21 are electrically connected in series so that they will operate simultaneously. The electrical or magnetic shutter actuating means is diagrammatically indicated at 22 for each shutter and the series circuit connections are indicated by the wires 23 and 24.

Means are provided for automatically closing the shutter circuit once for each tracer bullet fired from the gun. As embodied, a rotary switch, comprising the stator or stationary contact 30 and a rotor or rotary contact 31, is mounted in the shutter circuit. The stator 30 comprises a disc 300 of conducting material which is connected to branch 23 of the shutter circuit. An annulus 301 of insulating material is broken at 30 to provide for a single contact on each revolution of the rotor. The rotor 31 of the switch is driven at a speed that will cause a closing of the switch once per each tracer shot from the gun so that there will be the same cyclic relation between the tracer intervals and the shutter intervals. The means for so rotating the rotor 31 comprises a motor 32 drivingly connected to the rotor 31 and adapted to rotate same in cyclic relation or synchronism with the firing of the gun. As shown the motor 32 is actuated by electrical impulses transmitted from the gun or from means operating synchronously with the firing of the gun. The firing mechanism of the gun indicated at 33 is shown actuated by a drive 34 from a motor 35, the firing mechanism being tripped at regular intervals by a cam 36 in said drive. Synchronous impulses are transmitted from said drive to the motor 32 by means of an electrical circuit 37 and 38. Said circuit is closed in regular and synchronous relation with the firing of the gun by means of a rotary switch diagrammatically shown at 39. Said switch 39 is driven by means of suitable gearing 40 from the gun drive 34. Thus the motor 32 is caused to rotate at a speed proportional to that of the firing of the gun and in a speed ratio corresponding to the ratio between tracers and service ammunition. For example if the ratio of tracers to service bullets is 1 to 5, the gearing 40 will impart impulses to the motor 32 at that ratio so that the switch 31 will be closed each time a tracer bullet is fired.

Figure 11:
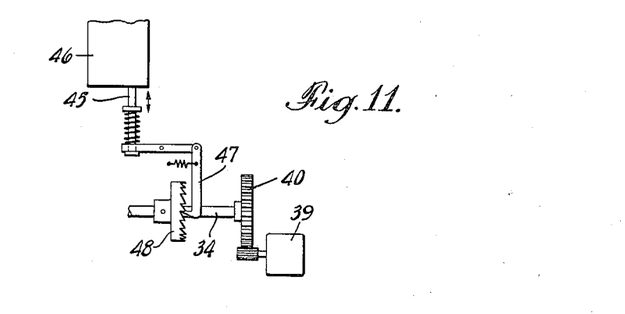
Fig. 11 is a fragmentary elevation of a modified mechanism showing actuation of the synchronizing circuit directly from the firing mechanism of the gun.

Other means may be provided for insuring that the intervals for closing the switch 30—31 will correspond to the tracer intervals. For example, the gun driving motor 35 may be dispensed with and the automatic firing of the gun itself can be utilized to control the operation of the motor 32. That is, the switch 39 can be actuated directly from some means, such as a pawl and ratchet actuated by the firing impulses of the gun. Such a device is shown diagrammatically in Fig. 11, wherein the member 45 is reciprocated upon each actuation of the gun mechanism 46. The impulses from member 45 are transmitted to the switch gearing 39 by means of the pawl 47 which engages ratchet 48 on the shaft 34.

Figure 12:
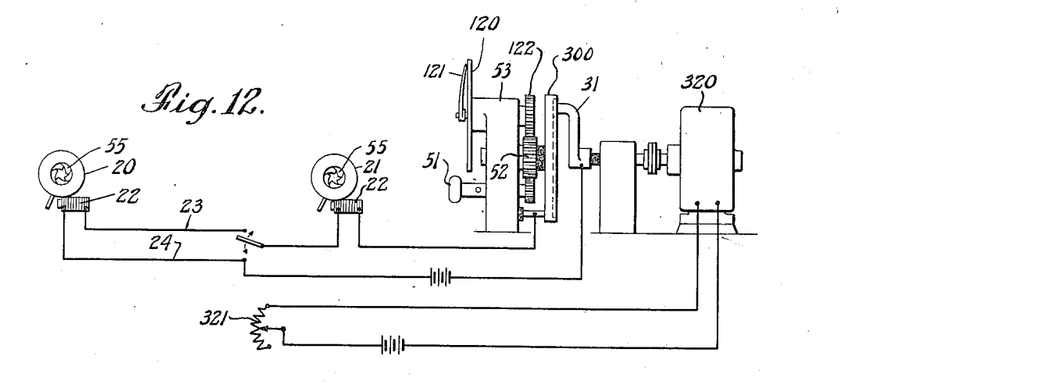
Fig. 12 is an elevation of a modified switch controlling mechanism.

In another form the synchronizing of the switch 30—31 may be effected arbitrarily and without any automatic linkage to the gun mechanism. For example, a suitable speed varying device such as a rheostat 321 may be provided for a constantly driven motor 320 which drives the rotor 31, as indicated in Figure 12. By suitable setting of the speed varying means there indicated, the operation of the rotary switch can be synchronized with the cyclic tracer intervals of the gun, and any change in said intervals can be immediately provided for.

As already stated, the invention also embodies means for predetermining and controlling the time at which the shutter flicker or signal will occur within a given tracer interval. By such control the operator can effect movement of the shutters at a time corresponding to the time of flight of any given tracer and can vary such movement for the varying times of flight of successive tracers. For example, if the interval between tracers were one second and the time of flight for the first tracer were 2.6 seconds, the closing of the shutter switch for said first tracer would occur 2.6 seconds after it was fired. If the second tracer had the same time of flight, the shutter signal for it would occur one second later, i. e., 3.6 seconds after the first tracer was fired. If the third tracer had a time of flight of 2.4 seconds the next shutter signal would occur .8 second later, i. e., 4.4 seconds after firing started.

As embodied, such control means may conveniently comprise a device for varying the position of the stator 30 of the shutter switch so that the closure of the switch can be made to occur at any point during the cyclic rotation of the rotor 31. As will be clear from Figs. 5 and 7, one complete revolution of the rotor 31 corresponds to the interval between tracers (say one second) while the position of the static contact 30 within that cycle of rotation will determine the instant at which the shutter will function within that interval. By advancing the position of the static contact 30 the closure of the shutter circuit will be delayed and made to occur at a later time within that cycle. Thus the effect of causing the shutter operation to occur at a later time and consequently at a time corresponding to a greater time of flight or range is secured for a given tracer. A similar effect to provide for a lesser time of flight is accomplished by retracting the stator 30. The effect of so varying the position of the switch stator is to cause the shutter switch to close in cyclic relation to, but out of phase with the firing of the successive tracers. By so varying the phase position of the switch the variations in time of flight can be provided for.

For mechanical convenience the stator disc 300 may be mounted on an insulated shaft 50 concentric with the axis of the rotor 31 and any suitable means such as the handle 51 and gearing 52 may be provided for turning said disc 300 to vary the position of the contact 30. A suitable stand or bracket 53 may be provided for supporting the various parts as described.

While a simple camera shutter has been shown and described as a means for effecting the visual signalling operation, other means may be provided for the same purpose. For example, the gunner may be provided with a color filter in his line of vision which will change the color or diminish the brilliance of the tracer throughout most of its visible path. When a tracer reaches the range of the target and it is desired to impart the signal to the gunner's eye for that particular tracer the color filter shutter may flash open to reveal the tracer momentarily as a different color and/or as a more brilliant light. For example, with tracers of the ordinary orange red color normally used, the filter would make the tracer appear grayish or neutral until the signalling position was reached. On the instant of the signal the tracer would appear in its normal color and intensity, thereby giving a very marked impression at the desired instant. In practice, the effect desired may be produced mechanically by constructing the shutter blades or leaves 55 (Fig. 5) of transparent color filter material. The shutter would remain closed during the travel of the tracer from gun to target, so that the gunner looking through the shutter would see the tracer as a grayish streak, or of diminished brilliance, or in a color different from its actual color in air. At the signalling position the shutter would open for an instant revealing the tracer as a brilliant spot in the sky. For many situations a color filter mechanism of the general nature described will be found preferable to a simple shutter, as it makes a more definite visual impression on the observer at the desired instant. It will be understood that when a color filter shutter is used, the shutter will be closed most of the time and open only at the instant of signalling, while with an opaque shutter it will be open except at the signalling instant and will then suddenly close and re-open to give the effect of a wink in the gunner's vision.

Figure 8:
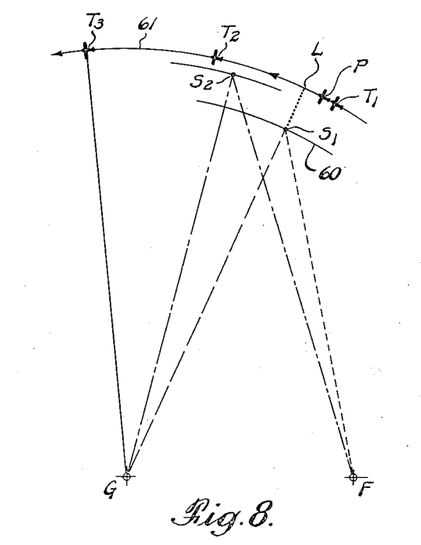
Fig. 8 is a diagrammatic plan view illustrating the application of the invention to an anti-aircraft problem wherein the target is flying on a course at a constant range from a gun.
Figure 9:
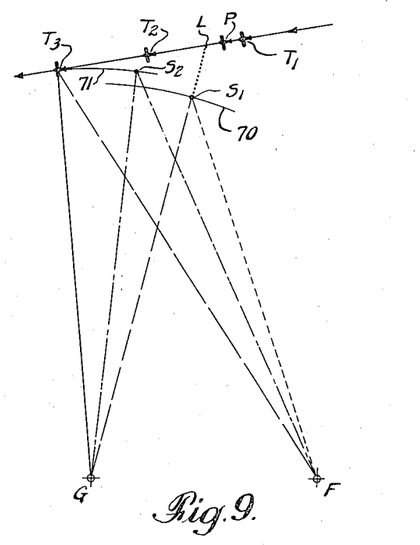
Fig. 9 is a view similar to Fig. 8 wherein the target is flying on a straight line course.

The operation of the mechanism in its relations to both the gunner and the flank observer is illustrated in Figures 7, 8, and 9. In Fig. 8 the line of flight of a target from right to left at a constant range is illustrated by the circle 61 and the position of the target approaching the first "future position" or location in which it was intended to be struck by the first tracer bullet is indicated at T1. The actual future position would be at the point P. The radial line GL indicates the actual path of the tracer. The circle 60 indicates the time of flight setting of the stator 30 for the firing of tracer number 1 so that the signal for that tracer occurred at the point S1, when the target was at T1. As shown, the time of flight setting for the indicated shot (made by observer F on the stator 30) was too small as the signal should have occurred on the curve 61. Also the lead used by the gunner was too great, as indicated by the relation between the points P and L.

Considering the situation from the viewpoint of the flank observer F, he can see that the time of flight setting for the signal was too small because the signal S1 would appear short of the target from his position. Consequently the flank observer would immediately advance the time of flight setting to make it correspond more nearly to the range of the target for the next tracer signal.

From the viewpoint of the gunner the deviation or lateral lead would appear too great as judged by the signal S1 and the position of the target at T1. Consequently the gunner's reaction would be to decrease the lead. The effect on the next signal of the corrections simultaneously made by the gunner G and flank observer F are indicated by the positions T2 and S2. As shown, the gunner decreased his lead too much and the flank observer increased the time of flight 62 too little. The third position T3 indicates a hit, both gunner and flank observer having applied corrections in the senses indicated by the previous positions T2 and S2.

Figure 9 illustrates the effect of successive corrections by both gunner and flank observer in a more usual case where the target is flying on a straight line and the range to the gun is changing. Positions T1 and S1 indicate the relations actually seen by flank observer and gunner at the instant of the signal, the true future position P of the target being disregarded. This diagram indicates how the flange observer takes into consideration the effect of the range change in making the time of flight adjustment on the shutter switch stator 30. Thus the initial time of flight setting 70, giving signal S1, was much too small for the position T1 of the target. The change to the time of flight setting 71 resulted in the signal S2 for position T2 of the target. If the range of the target had remained constant, as in Figure 7, the flank observer would have had to make a third change in the time of flight setting. However, the range was actually decreasing due to the travel of the target, so that the time of flight setting of the instrument required no further change. In other words the flank observer F could estimate that the speed and direction of the target would bring it within range for the third shot, which is shown as a hit at T3. On the next or fourth slot (not shown) the flank observer would decrease the time of flight setting again by an amount corresponding to the actual decrease in range. Thus the underlying principle of the invention is illustrated as providing for synchronized intersecting observations of the gunner and flank observer upon successive tracers when they are at the range of the target. Thereby the gunner can make true corrections.

From the foregoing description of the construction and use of the invention it will be clear that the successive visual signals will occur at cyclic intervals and at the proper points along the successive tracer trajectories regardless of the changing range of the target. Thus in its visual form the operation of the invention is similar in principle to that of a stroboscope, having regard to the cyclic occurrence of the tracer signals and the means for varying the phase at which the successive signals occur within the cycles.

While the invention has been illustratively described as applying to a single gun and to a single flank observer, it is not so limited in either respect. For example the invention contemplates the operation of a plurality of machine guns centrally located and firing tracers synchronously under the control or signalling direction of a single flank observer as heretofore described. Alternatively a group of machine guns without tracer ammunition may be provided with sights of any known or suitable design on which deflections can be set, the deviations being determined by the use of a master gun using tracers and spotting its fire as heretofore described. In such an arrangement the sight settings may be transmitted mechanically, electrically or by other means from the master gun to the sights on the other guns or may be applied by an observer at the master gun.

Figure 10:
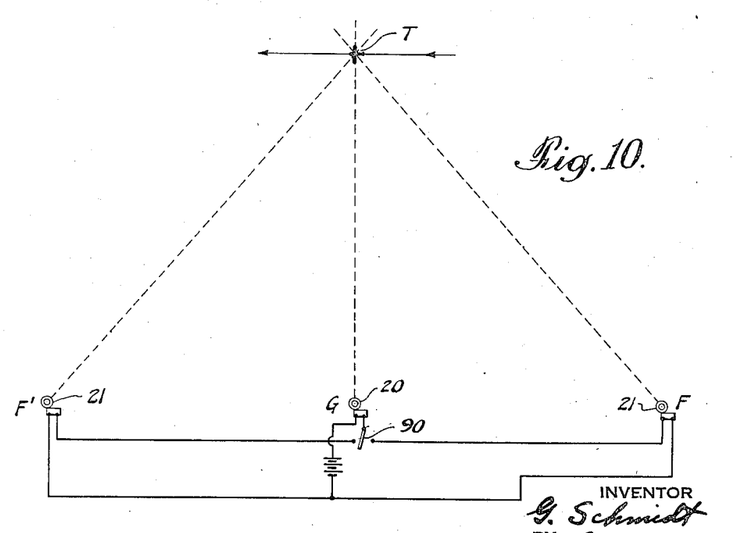
Fig. 10 is a diagrammatic plan view illustrating utilization of two flank operators.

The invention further contemplates the provision and use of a plurality of flank observers located at different positions with respect to the machine gun being controlled. Thus (Fig. 10) the gunner's shutter or other signalling means 30 may be connected to the control devices of several flank observers located at different points, only one of which functions with respect to the gunner for a given shot or series of shots. That is, an observer F' on the right hand of the gunner may be located in the best position for observation during the first part of the target's flight. The gunner, by means of a shutter circuit switch 90, might disconnect his shutter from the control of the right hand observer and switch in the control of an observer F'' on his left who would thereupon undertake regulation of the synchronized observations and signals.

Figure 13:
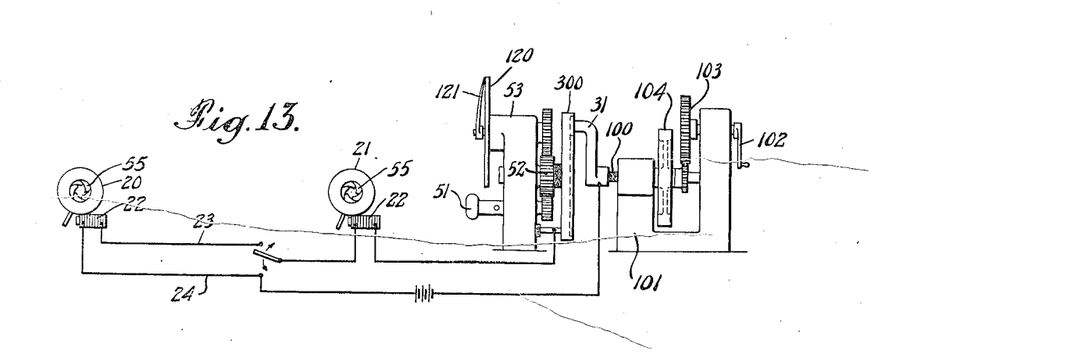
Fig. 13 is a similar view of another modification utilizing manual actuating means for the switch.

A further modification of the cyclic switch operating means at the flank station is shown in Fig. 13. As embodied, means are provided for manually operating the switch rotor 31 without any mechanical or electrical synchronizing linkage with the gun and without any power drive for the switch. Accordingly the rotor shaft 10, is insulatingly journaled in a stand 101 and is operatively connected to a hand crank 102 through multiplying gearing 103. A fly wheel 104 is mounted on the shaft to insure smoothness of operation and to assist in maintaining the cyclic speed attained by the operator. In practice it will be possible for the flank observer to soon determine the speed required for a given tracer interval used by the guns, while observation through his shutter 21 will enable him to see when the proper stroboscopic effect is being obtained in the placing of the signals on the successive tracer trajectories.

In addition to its use as hereinbefore described for spotting and correcting fire, the invention inherently provides means for determining the actual time of flight of a visible projectile. That is, as already described, the setting of the stator 30 by the flank observer automatically determines or sets off the time of flight to the future position. By suitable indicia, the time of flight can be directly read from the stator setting or can be transmitted mechanically or verbally to any desired computing or position finding devices for use in connection with setting of sights or other purposes related to the gunnery problem presented by the target under observation. A suitably calibrated dial 120 is indicated in Fig. 6, said dial being stationary on the frame 53 and calibrated in time of flight readings. A pointer 121 is rotatably mounted on the dial and connected by gearing 122 to the stator shaft 50 to rotate therewith. Thus the position of the pointer 121 will indicate on the dial a reading in seconds corresponding to the time of flight set for the next tracer signal by the position of contact 30.

The invention may be utilized even when several groups of guns located in different positions are firing at the same target. This situation frequently occurs in anti-aircraft defense networks, wherein two or more gun platoons are separated from each other but direct a cross-fire onto the same target. By having the several platoons utilize tracers of different distinctive colors, their gunners and observers will be able to distinguish their own shots from those of the other platoons and thereby carry on the fire control in accordance with the principles of the invention without confusion.

The invention in its broader aspects is not limited to the specific mechanism shown and described but departures may be made therefrom within the scope of the accompanying claims without departing from the principles of the invention and without sacrificing its chief advantages.

What I claim is:

1. In a system of gunnery fire control the steps of firing a projectile at a moving target, rendering the projectile visible throughout at least a portion of its trajectory, and indicating to an observer at the gun when the projectile is at the range of the target.

2. In a system of gunnery fire control the steps of firing a projectile at a moving target, rendering the projectile visible throughout at least a portion of its trajectory, and visually indicating to an observer at the gun when the projectile is at the range of the target.

3. In a system of gunnery fire control the steps of firing a projectile at a moving target, rendering the projectile visible throughout at least a portion of its trajectory, and indicating to an observer at the gun when the projectile is at the range of the target by modifying the observer's view of the projectile at that instant.

4. In a system of gunnery fire control the steps of firing a projectile at a moving target, rendering the projectile visible throughout at least a portion of its trajectory, observing the trajectory and target from the gun, simultaneously observing the trajectory and target from a flank position, and indicating to the observer at the gun when the flank observer sees the projectile at the same range as the target.

5. In a system of gunnery fire control the steps of firing a projectile at a moving target, rendering the projectile visible throughout at least a portion of its trajectory, observing the trajectory and target from the gun, simultaneously observing the trajectory and target from a flank position and indicating to the gun observer when the flank observer sees the projectile intersect the line between the flank observer and the target.

6. In a system of gunnery fire control the steps of firing a projectile at a moving target, rendering the projectile visible throughout at least a portion of its trajectory, and rendering visually distinct to an observer at the gun the point on said trajectory which is at the range of the target.

7. In a system of gunnery fire control the steps of firing a succession of projectiles from a gun at a moving target, rendering visible at least portions of the trajectories of said projectiles, and rendering visually distinct to an observer at the gun the point on each successive trajectory which is at the range of the target.

8. In a system of gunnery fire control the steps of firing a succession of projectiles from a gun at a moving target, rendering visible at least portions of the trajectories of said projectiles, observing the successive trajectories from a position at the gun, simultaneously observing said trajectories from a flank position, rendering visually distinct to the gun observer a point on each successive trajectory at a predetermined time of flight from the gun, and causing said points to correspond to the range of the target for each trajectory.

9. In a system of gunnery fire control the steps of firing a succession of projectiles from a gun at a moving target, rendering visible at least portions of the trajectories of said projectiles, observing the successive trajectories from a position at the gun, simultaneously observing said trajectories from a flank position, rendering visually distinct to the gun observer a point on each successive trajectory at a predetermined time of flight from the gun, and varying said times of flight to cause said points to correspond with the intersections of said projectiles with the line of sight between the flank observer and the target.

GRAYSON SCHMIDT.